United States Patent [19]

Saunders

[11] Patent Number: 5,204,187

[45] Date of Patent: Apr. 20, 1993

[54] COMPOSITE-COATED FLAT-ROLLED SHEET METAL PRODUCT

[75] Inventor: William T. Saunders, Weirton, W. Va.

[73] Assignee: Weirton Steel Corp., Weirton, W. Va.

[21] Appl. No.: 812,567

[22] Filed: Dec. 20, 1991

Related U.S. Application Data

[60] Division of Ser. No. 318,677, Mar. 3, 1989, Pat. No. 5,084,358, which is a continuation-in-part of Ser. No. 855,694, Apr. 25, 1986, Pat. No. 4,812,365.

[51] Int. Cl.$^5$ ............................................... B32B 9/02
[52] U.S. Cl. ................................. 428/473; 428/469; 72/47
[58] Field of Search ......................... 72/47; 205/188; 428/469, 473

[56] References Cited

U.S. PATENT DOCUMENTS

| | | | |
|---|---|---|---|
| 3,717,509 | 2/1973 | Palm | 205/188 |
| 4,726,208 | 2/1988 | Saunders | 72/47 |
| 5,084,358 | 1/1992 | Saunders | 428/469 |

*Primary Examiner*—Thurman K. Page
*Assistant Examiner*—William E. Benston, Jr.
*Attorney, Agent, or Firm*—Raymond N. Baker

[57] ABSTRACT

Composite-coated flat-rolled steel, product, method of manufacture and method of fabrication in which single or double-reduced low-carbon steel, after surface preparation, is flash-coated with tin (about 0.05 #/bb) which is alloyed with the base metal. Dichromate treatment passivates the tin-iron alloy surfaces depositing a chrome oxide layer prior to application of an organic coating (about 3 to 15 mg/in$^2$ to each surface). Enhanced coating adhesion of the organic coating enables draw-processing of the double-reduced steel base metal substrate into unitary can bodies without damage to coating or substrate.

1 Claim, 2 Drawing Sheets

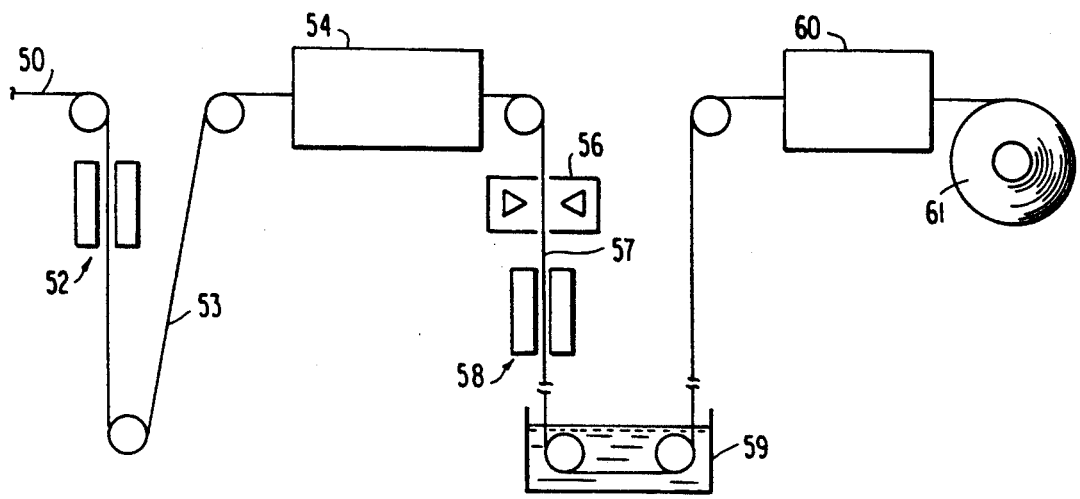
FIG. 2
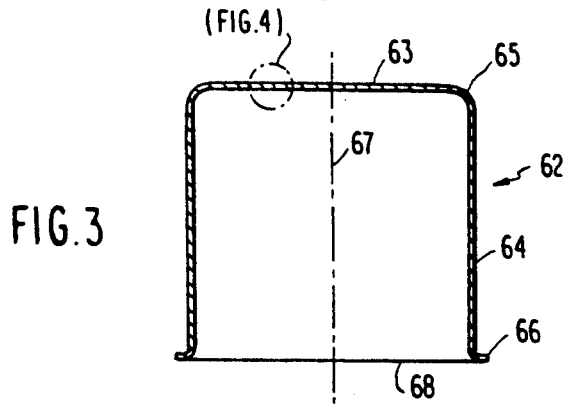
FIG. 3
FIG. 4
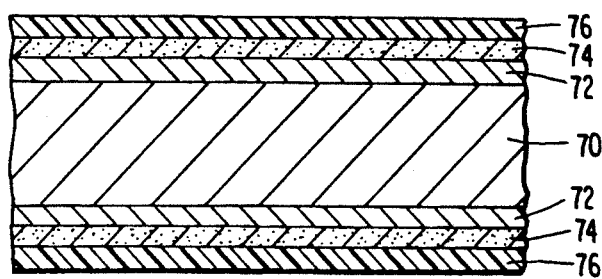

COMPOSITE-COATED FLAT-ROLLED SHEET METAL PRODUCT

This is a division of application Ser. No. 07/318,677, filed Mar. 3, 1989 now U.S. Pat. No. 5,084,358, which is a continuation in part of 06/855,694, filed Apr. 25, 1986, now U.S. Pat. No. 4,812,365.

This invention relates to flat-rolled sheet metal coating methods and products; and, in one of its more specific aspects, is concerned with composite-coated flat-rolled steel can stock which can be used directly for fabrication of draw-processed one-piece can bodies without damage to coating or base metal.

Tinplated steel established the protection standards for and was substantially the only product used for sheet metal vacuum packing of comestibles until tin costs led to investigation of substitute metal coatings. Chromium became a widely used substitute, applied by electrolytic deposition of chromium-chromium oxide on flat-rolled steel to produce the product referred to as tin free steel (TFS).

However, plating chromium requires significantly higher electrolytic capacity and is not considered as efficient as tinplating so that a significant number of steel mills which had electro-tinplating facilities decided against installation of TFS facilities.

However, the teachings of prior art patents, such as U.S. Pat. No. 3,826,628 "Coated Steel Product" and others, on the properties of TFS have, notwithstanding plating difficulties and inefficiencies, increased demand for TFS; yet, prior to the present invention no commercially viable substitute for TFS was made available.

The primary objective of the present invention is to provide base metal protection and desired organic coating adhesion properties, for one-piece can manufacture, without reliance on TFS plating capability.

Thus, the invention also helps to eliminate the difficulties of applying an organic coating after a can part, such as a one-piece can body, has been formed. The invention enables more complete and uniform organic coating, applied to a steel base metal product in sheet or coil form, than is practicable with formed articles. And, such composite-coated substrate is capable of being draw formed into one-piece can bodies without damage to coating or base metal. As a result, one-piece draw-redraw can body production is made more efficient and more economical.

Other advantages and contributions are considered in more detail in describing embodiments of the invention shown in the accompanying drawings, in which:

DETAILED DESCRIPTION OF THE DRAWING

FIG. 2 is a schematic presentation of a continuous-strip embodiment of a portion of the processing line of FIG. 1;

FIG. 3 is a schematic view in a plane which includes the centrally located longitudinal axis of a redraw one-piece can body, and FIG. 4 shows a portion of FIG. 3 in enlarged cross section showing composite-coated substrate in accordance with the invention.

Figure 1:
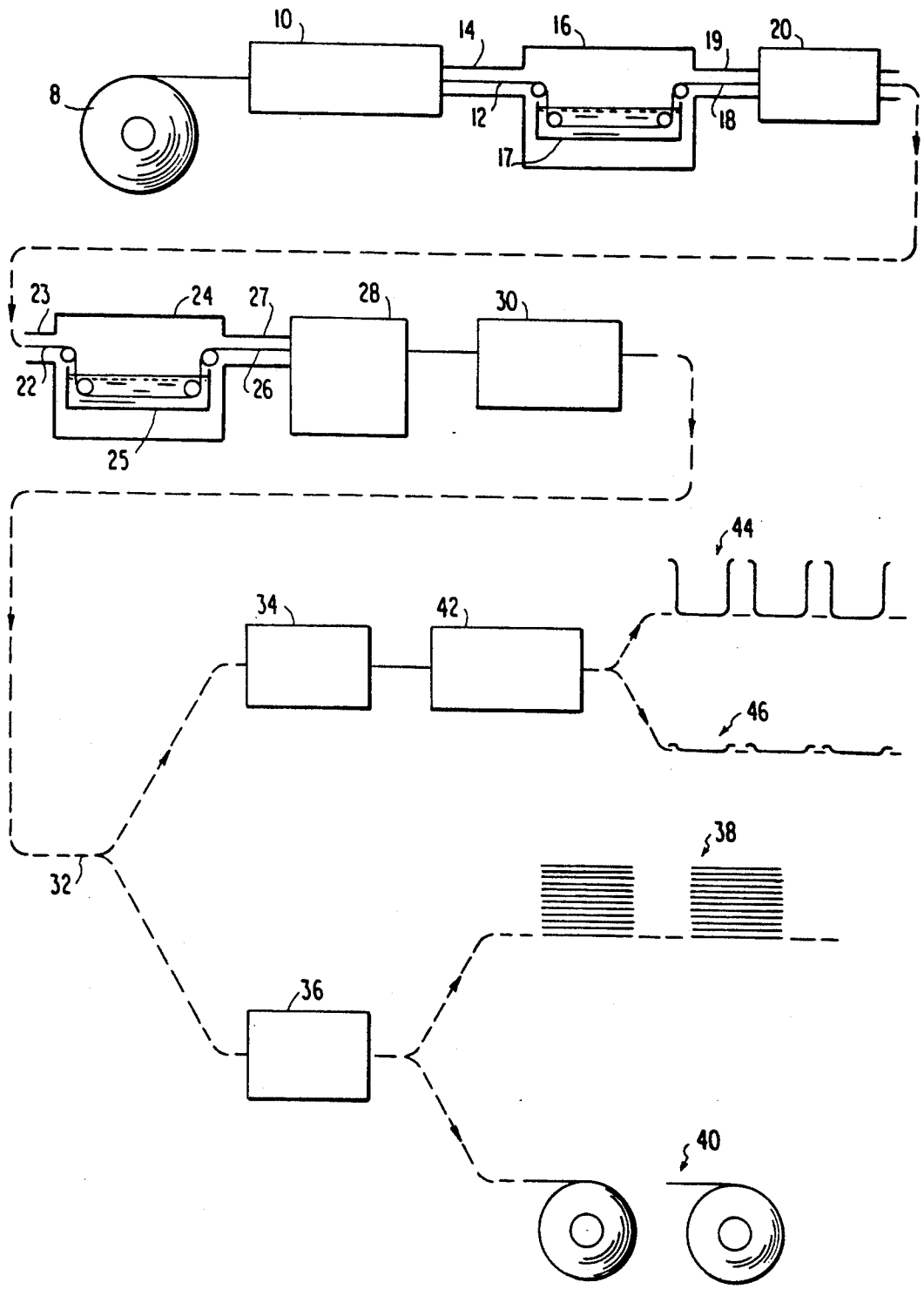
FIG. 1 is a schematic general arrangement view using box diagrams for describing flat-rolled sheet metal processing in accordance with the present invention.

Processing of the invention provides a new composite-coated cold-rolled single-reduced or double-reduced low-carbon flat-rolled steel in the range of about fifty-five (55) to about one hundred ten (110) pounds per base box. Such new composite-coated flat-rolled steel contributes significant canmaking advantages in draw-processing one-piece can bodies, which can be fabricated directly from double-reduced steel, pretreated and precoated as coil or sheet with an organic coating prior to fabrication; and, for end closure fabrication from either single-reduced or double-reduced stock. "Double-reduced" as used herein refers to high tensile strength flat-rolled steel (for background see *Making, Shaping and Treating Steel*, 10th Ed., Chapter 36, p. 1144, ©AISE, printed by Herbick & Held, Pittsburgh, Pa.); and, in particular to double-reduced stock which is less susceptible to work hardening due to a cold reduction without subsequent anneal.

Continuous-strip processing is provided throughout base metal preparation, metal plating and other treatments. Continuous-strip processing is also provided for organic coating purposes; however, substrate processed in accordance with the invention can be organically coated as sheet stock (cut lengths).

Referring to FIG. 1, both planar surfaces of the flat-rolled base metal (blackplate) from coil 8 are prepared for plating in surface preparation stage 10. Surface preparation stage 10 provides for selection from a plurality of surface cleaning techniques including scrubbing, electrolytic cleaning, and/or an acid pickling treatment. Strip 12 is then fed through, preferably atmosphere controlled, chute 14. Atmosphere controlled, as used herein, refers to a sufficiently neutral, or reducing, atmosphere to avoid surface oxidation or otherwise controlled to prevent surface contamination. While such atmosphere control, and the decreased handling provided, as taught herein, by avoiding recoiling and uncoiling during composite coating, are preferred for improved product quality and efficiency. However, acceptable steel base-metal, composite-coated substrate for present purposes can be prepared by use of the prior art handling practice which involves exposure to ambient atmosphere and repeated coiling for transfer and uncoiling to carry out the preparation, multiple treatments, and coating applications of the composite-coated substrate of the present invention.

After such cleaning, both surfaces are electrolytically plated at tin plating stage 16 using a known electrotinplating process (for example, a Halogen-type, U.S. Pat. No. 3,264,198) as represented by plating cell means 17.

A flash coating of tin of about 0.05 pound per base box (31,360 sq. inches) is applied to the strip. Such tin coating weight, as expressed, represents the tin on the total area (both surfaces) of the sheet metal (for "base box" definition see Making, Shaping and Treating of Steel, p. 1141, as previously referenced.

After rinsing, the flash-coated tinplated strip 18 is directed through chute 19 (preferably using a controlled atmosphere) into alloying apparatus 20. The flash-coated tin is alloyed with the base metal using, for example, high frequency induction heating of the base metal.

As taught herein, such tin-iron alloy provides desired base metal protection along with providing for enhanced adhesion for an organic coating through use of a chemical bath treatment.

Tin-iron alloy coated strip 22 is directed through, preferably atmosphere controlled, chute 23 to a dichromate chemical treatment stage 24 represented by bath means 25. Chrome oxide is applied; and, as taught herein, passivates both tin-iron surfaces as well as providing for enhanced adhesion of an organic coating. It is believed, without being limited thereto, that chrome oxide in combination with such alloy of iron improves the receptivity for organic coating. Such passivation helps to prevent oxidation of the tin-iron alloy surfaces and also improves surface wetability so as to facilitate adhesion of the later applied organic coating.

Chrome oxide can be applied by a sodium dichromate treatment carried out by immersion, with no electrolytic action, to deposit about one hundred fifty (150) micro-grams of chrome oxide per square foot, plus or minus one hundred (100) mg/ft$^2$. Electrolytic action increases dichromate treatment coating weights; for example, CDC-3 provides 350 (plus or minus 100) mg/ft$^2$ of surface; CDC-5 provides 550 (plus or minus 100) mg/ft$^2$ of surface, and CDC-7 provides 650 (plus or minus 100) mg/ft$^2$; such coating weights are measured on each surface.

While limiting access of an oxidizing atmosphere is preferred, the passivating dichromate treatment of the tin-iron alloy diminishes concern with surface oxidation. Also, where necessary to transfer such treated strip for organic coating, an oil, which is compatible with subsequent organic coating, can be applied for coiling purposes; preferably, however, the work product proceeds directly in line to application of an organic coating.

From surface passivation treatment stage 24, substrate 26 is directed through chute 27 to organic coating stage 28 for organic coating. Generally, the organic coating is applied in solvent form; a dual organic coating system, with a primer followed by a finish coat, can be utilized. After each solvent coat, the substrate is directed to station 30 for driving off the solvent and curing the organic coating. Various heating means can be used to reach the preselected temperature(s) required for organic coatings acceptable in the art. Suitable solid film organic coating, as available, can be applied with heating at station 30 being used for drying a film adhesive.

Organically coated substrate 32 is directed through draw lubrication application station 34 for fabrication; or, through an oil coating stage 36 for transfer to provide either coated sheets 38 or coated coils 40.

Composite-coated, double-reduced flat-rolled steel is directed to fabricating apparatus 42. Unitary can bodies 44 are formed by draw processing relying on methods and apparatus providing for controlled draw tensioning of coated substrate so as to avoid an increase in sidewall thickness which would be detrimental to coating adhesion. Such draw processing methods and apparatus are described in more detail in applicant's copending application Ser. No. 831,624, DRAWN CAN BODY METHODS, APPARATUS AND PRODUCTS, filed Feb. 21, 1986, which is included herein by reference.

Single or double reduced stock can be processed into end closure blanks or shells 46.

In the embodiment of FIG. 2, a continuous steel strip 50 which has been flash coated with 0.05 #/bb of tin is directed through heating means 52 for alloying the tin with the base metal.

Such tin-iron alloy finish steel strip 53 is directed into dichromate treatment station 54 for passification treatment and drying prior to being directed to organic coating station 50. Organically coated strip 57 is then directed through heating means 58 for curing of the coating and/or drying; and, then, to cooling bath 59. A coiling oil application stage 60 can be utilized prior to coiling at station 61; or the composite-coated substrate can be delivered directly for fabrication as previously described.

FIG. 3 shows a redrawn can body 62 with unitary end wall 63 connected to sidewall 64 by curvilinear transition zone 65. Can body 62 is redrawn as shown so as to present flange metal 66 which is disposed in a plane substantially perpendicular to centrally located axis 67 and is located at open end 68 defined by sidewall 64. Can body 62 is redrawn open end down under controlled tension utilizing the above-referenced controlled draw-tension process in which sidewall gage is decreased slightly, as end wall metal is added to the height of the sidewall, during can body fabrication.

Such draw processing without damage to coating or base metal is facilitated by previously described characteristics of the composite-coated substrate of the invention. As shown in enlarged cross section (FIG. 4) such composite coated substrate comprises flat rolled steel base metal 70 and, on each surface: a tin-iron alloy layer 72 formed by alloying a flash coating of tin with the base metal, a chrome oxide layer 74, and an external organic-surface coating layer 76.

Organic coating, as used herein, refers to organic polymeric materials, such as the epoxies, vinyls and/or polyesters which are accepted by regulating agencies, such as the U.S. Food and Drug Administration, for use in sheet metal canning of comestibles. Such organic coating materials are available through The Valspar Corporation, Pittsburgh, Pa. 15233, Dexter Corporation—Midland Division, Waukegan, Ill. 60085, DeSoto, Inc., Des Plaines, Ill. 60018, or BASF Corporation—Inmont Division, Clifton, N.J. 07015.

Organic coating weights fall in the range from about three (3) and approaching about fifteen (15) micrograms per square inch of surface. Coating weights of ten (10) mg/in$^2$ and above would generally be used on the surface for the exterior of a can; lighter coating weights (less than about 10 mg/in$^2$) would generally be used on the surface for the interior of the can.

A preferred flat-rolled steel for draw-processing unitary can bodies is double-reduced sixty-five lb/bb; about seventy-five to ninety lb/bb single-reduced is preferred for end closures.

While specific composite-coating materials including organic coating types and weights suitable for comestibles have been identified along with substrate data for purposes of describing the invention; it should be recognized however that other passivating and adhesion enhancing chemical treatments may be found suitable for the tin-iron alloy surfaces in the light of the above teachings and, that other organic coating materials may be found acceptable to regulatory agencies; therefore, for purposes of defining the scope of the present invention reference should be made to the appended claims.

I claim:

1. A one-piece draw-processed can body which is symmetrically disposed in relation to a centrally located axis and having
   a closed endwall,
   a unitary side wall joined to such closed endwall by a transition zone which is curvilinear in a cross-sectional plane which includes such centrally located axis, and
   flange metal, formed during such draw processing, located at such open end of the can body defined by such side wall, such flange metal being oriented in a plane which is substantially perpendicularly transverse to such centrally located axis; with such can body being fabricated from composite-coated flat-rolled steel substrate capable of being fabricated directly into sheet metal articles, without damage to such coating or substrate, manufactured by selecting base metal from the group consisting of double-reduced flat-rolled steel in the range of about 55 to 90 #/bb and single-reduced flat-rolled steel in the range of about 55 to 110 #/bb.

preparing both surfaces of such base metal for plating, applying about 0.05 #/bb of tin to such base metal, alloying such tin with such base metal to present external tin-iron alloy surfaces, chemically treating such tin-iron alloy surfaces to passivate such tin-iron alloy and enhance adhesion properties for organic coating so as to enable fabrication of such articles without damage to organic coating or base metal, applying organic to each such chemically treated surface to provide an organic coating weight in the range of about 3 to about 15 milligrams/in$^2$ on each surface, and treating such coated substrate to carry out a step selected from the group consisting of curing such organic coating and drying an adhesive for such organic coating.

* * * * *